United States Patent Office

3,711,533
Patented Jan. 16, 1973

3,711,533
DIALKYLAMINOALKYL ESTERS OF 6-CHLORO-1,2,3,4 - TETRAHYDRO - 1 - NAPHTHALENE-ACETIC ACID AND Δ¹ ANALOGS
Robert W. Hamilton, Wilmette, Ill., assignor to G. D. Searle & Co., Chicago, Ill.
No Drawing. Continuation-in-part of application Ser. No. 860,050, Sept. 22, 1969, now Patent No. 3,668,251. This application Aug. 9, 1971, Ser. No. 170,362
Int. Cl. C07c 93/20
U.S. Cl. 260—469                                        7 Claims

ABSTRACT OF THE DISCLOSURE

Preparation of the captioned compounds—for example, 6-chloro-N-(2-diethylaminoethyl) - 1,2,3,4 - tetrahydro - 1 - naphthaleneacetamide, 2-dimethylaminoethyl 6 - chloro-1,2,3,4-tetrahydro-1-naphthaleneacetate hydrochloride, etc—and their valuable biological properties— including antiulcerogenic, antibiotic, and antiinflammatory activities—are disclosed.

---

The application for Letters Patent securing the invention hereinafter described and claimed is a continuation-in-part of applicant's prior copending application Ser. No. 860,050 filed Sept. 22, 1969, now Pat. No. 3,668,251.

This invention relates to dialkylaminoalkyl amides and esters of 6-chloro-1,2,3,4-tetrahydro-1-naphthaleneacetic acid and Δ¹ analogs thereof, and to processes for their preparation. More particularly, this invention provides new, unobvious, and useful chemical compounds of the formula

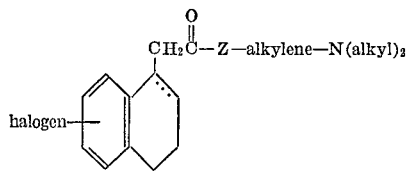

wherein Z represents imino (—NH—) or oxy (—O—) and the dotted line signifies that the indicated carbon atoms can be either singly bonded or doubly bonded together, i.e., that the compounds are optionally Δ¹ unsaturated.

The alkyls called for in the above formula are preferably of lower order, viz methyl, ethyl, propyl, isopropyl, butyl, isobutyl, sec.-butyl, tert.-butyl, pentyl, neopentyl, hexyl, isohexyl, heptyl, and like saturated, monovalent, acyclic, straight- or branched-chain, hydrocarbon radicals of empirical formula $$-C_nH_{2n+1}$$

wherein $n$ represents a positive integer less than 8. The alkylene moieties involved are preferably of lower order also, viz, methylene, ethylene, trimethylene, propylene, tetramethylene, 1,1 - dimethylethylene, pentamethylene, 2,2-dimethyltrimethylene, and like saturated, bivalent, acyclic, straight- or branched-chain, hydrocarbon radicals of empirical formula $$-C_nH_{2n}-$$

wherein $n$ is defined as before. Among the variously-positioned halogens contemplated, a 6-chloro substituent is preferred.

Equivalent to the foregoing compounds for the purposes of this invention are non-toxic acid addition and quaternary ammonium salts thereof having the formula

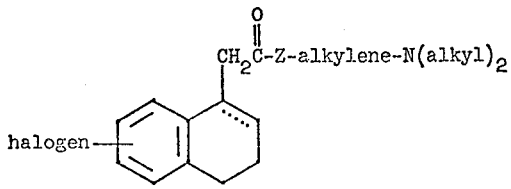

wherein Z and the dotted line have the meanings previously assigned; Q represents hydrogen, lower alkyl, hydroxy (lower alkyl), lower alkenyl such as vinyl and allyl, or aralkyl such as benzyl and phenethyl; and T represents 1 equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither biologically nor otherwise undesirable.

The compounds to which this invention relates are useful by reason of their valuable biological properties. Thus, for example, the subject compounds are antiulcerogenic, antibiotic, and antiinflammatory. Typical of organisms subject to their antibiotic effects are bacteria, protozoa, helminths, fungi, algae, and dicotyledonea.

The antiulcerogenic utility of the instant compounds is evident from the results of the standardized test for such utility described in U.S. 3,459,758.

The antibacterial utility of the instant compounds is evident from the results of a standardized test for their capacity to prevent the growth of *Diplococcus pneumoniae*. In this test, sterile blood agar plates are inoculated with *D. pneumoniae*, approximately 5 mg. of compound is placed on the surface of each plate so as to cover a circle approximately 4 mm. in diameter, and the plates are thereupon aerobically incubated for 24 hr. at 36° C. Clear zones of inhibition signify the utility in question.

Further evidence of the antibacterial utility of the instant compounds is provided by standardized tests for their capacity to prevent the growth of *Bacillus substilis* and *Escherichia coli*. In these tests, a mixture of 5 mg. of compound with 5 ml. of sterile nutrient broth is heated at 80° C. for 20 minutes, then cooled to around 25° C., and finally serially diluted and mixed with sufficient quantities of a mixture of sterile nutrient broth and 1% of a culture of either *B. substilis* or *E. coli* to produce concentrations of approximately 400, 100, 25, and 6 mcgm. of compound per ml. The resultant mixtures are incubated for 20–24 hr. at 37° C. Controls are provided by concurrent incubations identical with the foregoing excepting that no compound is present. Activity is determined by gross examination; and potency is expressed as the minimum concentration, in mcgm. of compound per ml., at which no growth of the test organism is discernible.

The antiprotozoal utility of the instant compounds is evident from the results of a standardized test for their capacity to immobilize *Trichomonas vaginalis*. In this test, 80 volumes of a modified Diamond medium prepared by mixing 1200 parts of trypticase (Baltimore Biological Laboratories), 600 parts of yeast extract (Difco), 300 parts of maltose, 60 parts of L-cysteine hydrochloride, 12 parts of L-ascorbic acid, 48 parts of dibasic potassium phosphate, 48 parts of monobasic potassium phosphate, and 27,000 parts of distilled water; adjusting the pH to 6.8 with aqueous 4% sodium hydroxide; incorporating 30 parts of agar (Baltimore Biological Laboratories); boiling for 1 minute to dissolve the agar; and sterilizing is diluted with 20 volumes of sterile Dubos medium serum. The resultant medium is inoculated with 2% (by volume) of either a 48-hr. or a 72-hr. culture of *T. vaginalis*. Meanwhile, compound is heated in sterile distilled water at a concentration of 2000γ per ml. and a temperature of 80° C. for 20 min. An equivolume mixture of this compound preparation and the inoculated medium is incubated anaerobically at 37° C. for 48 hr. and then examined microscopically for the presence of motile trichomonads. If any are observed, the compound is considered inactive. If no motile trichomonads are observed, the incubated mixture is serially diluted and mixed with an inoculated medium of the same composition as that described above excepting that 54,000 parts of distilled water instead of 27,000 parts and 1% (by volume) of the culture instead of 2% are incorporated. Amounts of the latter medium added are such that concentrations of 100, 10 and 1γ of compound per ml. result. The mixtures thus obtained are incubated as before and then examined microscopically for motile trichomonads. Potency is expressed as the minimum concentration at which no motile trichomonads are discernible. Controls are provided by concurrent incubations identical with the foregoing except for the absence of compound.

Further evidence of the antiprotozoal utility of the instant compounds is provided by standardized tests for their capacity to inhibit the growth of *Trichomonas vaginalis* and *Tritrichomonas foetus* conducted as follows: To 80 volumes of a modified Diamond medium prepared by mixing 1200 parts of trypticase (Baltimore Biological Laboratories), 600 parts of yeast extract (Difco), 300 parts of maltose, 60 parts of L-cysteine hydrochloride, 12 parts of L-ascorbic acid, 48 parts of dibasic potassium phosphate, 48 parts of monobasic potassium phosphate, and 54,000 parts of distilled water; adjusting the pH to 6.8 with 4% sodium hydroxide; incorporating 30 parts of agar (Baltimore Biological Laboratories); boiling for 1 minute to dissolve the agar; and sterilizing in an autoclave, is aseptically added 20 volumes of sterile Dubos medium serum. The resultant medium is inoculated with 1% (by volume) of either a 48-hr. or a 72-hr. culture of *T. vaginalis* or *T. foetus*, whereupon 1 ml. of the inoculated medium is mixed with 10 mg. of test compound. The mixture is incubated anaerobically at 37° C. for 48 hr. and then examined microscopically for the presence of motile trichomonads. If any are observed, the compound is considered inactive. If no motile trichomonads are observed, 0.1 ml. of the incubated mixture is serially diluted and mixed with additional quantities of the inoculated medium sufficient to produce concentrations of 1000, 100, 10, and 1 mcgm. of test compound per ml.; and the resultant mixtures are inoculated anaerobically as before at 37° C. for 48 hr. and then examined microscopically for motile trichomonads. Controls are provided by concurrent incubations identical with the foregoing except for the absence of test compound.

The anthelmintic utility of the instant compounds is evident from the results of standardized test for their capacity to immobilize *Turbatrix aceti*, a representative nematode. In this test, a washed suspension of *T. aceti* containing approximately 2000 nematodes per ml. is prepared in distilled water, whereupon 1 ml. of the suspension is mixed with 10 mg. of test compound. The mixture is incubated at room temperatures for 48 hr. and then examined grossly for the presence of motile worms. If any are observed, the compound is considered inactive. If no motile worms are observed, 0.1 ml. of the incubated mixture is serially diluted and mixed with a freshly-prepared suspension of the nematodes to produce concentrations of 1000, 100, 10, and 1 mcgm. of test compound per ml.; and the resultant mixtures are incubated as before at room temperatures for 48 hr. and then examined grossly for the presence of motile worms. Controls are provided by concurrent incubations identical with the foregoing except for the absence of test compound.

The antifungal utility of the instant compounds is evident from the results of standardized tests for their capacity to inhibit the growth of *Trichophyton mentagrophytes, Candida albicans,* and *Ceratocystis ulmi*. In these tests, a mixture of 10 mg. of compound with 10 ml. of melted Sabouraud agar is heated at 80° C. for 20 minutes, then serially diluted and mixed with sufficient additional melted Sabouraud agar to produce concentrations of 1,000, 100, 10 and 1 mcgm. of compound per ml. The resultant mixtures are allowed to cool and solidify, whereupon they are surface-inoculated with a suspension of *T. mentagrophytes, C. albicans,* or *C. ulmi,* and then incubated at room temperatures. The incubation period is 48 hr. for *C. albicans* and 6–7 days for the other two organisms. Controls are provided by concurrent incubations identical with the foregoing excepting that no compound is present. Activity is determined by gross examination and expressed as mcgm. of compound per ml. wherein no growth of the test organism is visible.

The antialgal utility of the instant compounds is evident from the results of a standardized test whereby a sterile Bristol agar plate is inoculated with *Chlorella vulgaris,* approximately 5 mg. of compound is placed on the surface of the plate so as to cover a circle roughly 4 mm. in diameter, and the plate is incubated at 25° under artificial light for 5–7 days. A clear zone of inhibition signifies the utility in question. Copper sulfate serves as reference standard.

The antigerminant utility of the instant compounds is evident from the results of a standardized test whereby three 42.5-mm. (diameter) filter paper discs are stacked in each of two 60-mm. Petri dishes, each stack is moistened with 2 ml. of distilled water, 10 white clover ( *Trifolium repens*—a representative dicotyledon) seeds are arranged atop each stack at approximately equal intervals around the periphery, approximately 5 mg. of compound is placed in the center of one seed circle (the other serves as control), the dishes are covered with glass lids and then incubated at room temperatures for 10 days, and germination in the control dish is thereupon compared with that in the dish containing seeds exposed to test compound.

The antiinflammatory utility of the instant compounds is evident from the results of the standardized test for such utility described in U.S. 3,455,921.

Those skilled in the art will recognize that observations of activity in standardized tests for particular biological effects are fundamental to the development of valuable new drugs, both veterinary and human. Distinct from such applications, antialgal compounds are adapted to the conditioning of boiler feedwater and the like, and antigerminant compounds serve as herbicides.

Preparation of the amides of this invention proceeds by heating polyhydronaphthaleneacetic acids of the formula

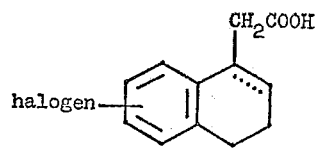

(wherein the dotted line has the significance previously assigned) with thionyl chloride to give the corresponding acid chlorides, from which the amides eventuate on heating in butanone with alkanediamines of the formula

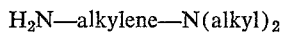
H₂N—alkylene—N(alkyl)₂

The esters of this invention are obtained by heating the polyhydronaphthaleneacetic acids aforesaid in 2-propanol with chloroalkylamines of the formula

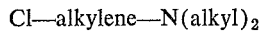
Cl—alkylene—N(alkyl)₂

The polyhydronaphthaleneacetic acid intermediates can be prepared by heating halotetralones of the formula

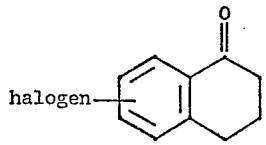

with methyl bromoacetate and zinc in benzene to give the corresponding methyl halo-1,2,3,4-tetrahydro-1-hydroxy-1-naphthaleneacetates

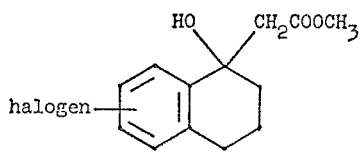

which lose water on heating with formic acid, affording the methyl halo-3,4-dihydro-1-naphthaleneacetates

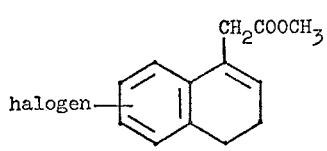

These esters are saponified with hot aqueous ethanolic sodium hydroxide and the resultant dihydro acids reduced, if desired, to tetrahydro acids by hydrogenation at atmospheric pressure in ethyl acetate, using palladium on charcoal as catalyst.

The amides and esters of this invention are converted to acid addition salts by mixing with inorganic and strong organic acids whose anionic components fall within the purview of T as hereinbefore defined. Alternatively, quaternization is effected by mixing the amides and esters with esters of the formula

QT wherein Q and T retain the meanings previously assigned. Quaternization is commonly carried out at 25–100° C. in an inert solvent such as chloroform, acetone, methanol, or the like, and is completed in from 1 to 48 hr. A closed system is used if the involved ester is a gas at operating temperature.

The following examples describe in detail compounds illustrative of the present invention and methods which have been devised for their preparation. Throughout the examples hereinafter set forth, temperatures are given in degrees centigrade, pressures in millimeters of mercury, and relative amounts of materials in parts by weight, except as otherwise noted.

EXAMPLE 1

(A) Methyl 6-chloro-1,2,3,4-tetrahydro-1-hydroxy - 1 - naphthaleneacetate.—To ½ of a solution of 45 parts of 6-chloro-3,4-dihydro-1(2H) - naphthalenenone and 77 parts of methyl bromoacetate in 160 parts of dry benzene under nitrogen at 60° is added 49 parts of freshly-sanded zinc strips, followed by just sufficient iodine to initiate reaction. External cooling is required because of the considerable heat evolved. When reaction subsides, the remaining half of the foregoing solution is quickly introduced; and the resultant mixture is thereupon heated at the boiling point under reflux for 45 minutes. The mixture is then cooled to 25° and poured into a mixture of 60 parts of concentrated hydrochloric acid, 250 parts of water, and 250 parts of ice. The benzene phase is separated, consecutively washed with water and aqueous 5% potassium carbonate, dried over anhydrous potassium carbonate, and distilled. The fraction boiling at 125°/0.5 mm. is methyl 6-chloro-1,2,3,4-tetrahydro-1-hydroxy-1-naphthaleneacetate.

(B) Methyl 6 - chloro - 3,4 - dihydro-1-naphthaleneacetate.—A mixture of 10 parts of methyl 6-chloro-1,2,3,4-tetrahydro-1-hydroxy-1-naphthaleneacetate and 50 parts of 98% formic acid is heated at 100° for 1 hour, then poured on to 200 parts of ice. The resultant mixture is extracted with ether. The ether extract is washed well with water, dried over anhydrous potassium carbonate, and distilled. The fraction boiling in the range 150–190°/12 mm. pressure is methyl 6-chloro-3,4-dihydro-1-naphthaleneacetate.

(C) 6-chloro - 3,4-dihydro-1-naphthaleneacetic acid.—To a solution of 6 parts of sodium hydroxide in 180 parts of water and 150 parts of aqueous 95% ethanol is added 30 parts of methyl 6-chloro-3,4-dihydro-1-naphthaleneacetate. The resultant mixture is heated at 100° for 1 hour, then stripped of solvent by vacuum distillation. The residue is washed with ether and then acidified with concentrated hydrochloric acid. The oil which separates solidifies on standing. The solid material is isolated by filtration, washed with water, and recrystallized from cyclohexane to give 6-chloro-3,4-dihydro-1-naphthaleneacetic acid sintering at 107° and melting at 110–112°.

(D) 6-chloro - 1,2,3,4 - tetrahydro - 1 - naphthalene acetic acid.—A solution of 60 parts of 6-chloro-3,4-dihydro-1-naphthaleneacetic acid in 5000 parts of ethyl acetate is hydrogenated at room temperatures and atmospheric pressure in the presence of 6 parts of 10% palladium on charcoal catalyst. When the theoretical uptake of hydrogen has occurred, catalyst is filtered out and the filtrate distilled. The fraction boiling at 140–150°/0.2 mm. pressure is 6 - chloro-1,2,3,4-tetrahydro-1-naphthaleneacetic acid which, crystallized from hexane, melts at 67–69°.

(E) 6-chloro - 1,2,3,4 - tetrahydro - 1 - naphthalene acetyl chloride.—A mixture of 10 parts of 6-chloro-1,2,3,4-tetrahydro-1-naphthaleneacetic acid and 200 parts of thionyl chloride is heated at the boiling point under reflux for 10 minutes, whereupon excess thionyl chloride is removed by vacuum distillation and the residue dried azeotropically with benzene. The resultant product is 6-chloro-1,2,3,4-tetrahydro-1-naphthaleneacetyl chloride.

(F) 6 - chloro-N-(2-diethylaminoethyl)-1,2,3,4-tetrahydro-1-naphthaleneacetamide.—To a solution of 50 parts of 6-chloro-1,2,3,4-tetrahydro-1-naphthaleneacetyl chloride in 500 parts of butanone is cautiously added 24 parts of N,N-diethylethylenediamine. The resultant mixture is heated at the boiling point under reflux for 5 minutes, then stripped of solvent by vacuum distillation. The residue is partitioned between ether and excess dilute aqueous sodium hydroxide. The ether phase is separated, washed well with water, dried over anhydrous potassium carbonate, and stripped of solvent by distillation. The residue is 6-chloro-N-(2-diethylaminoethyl) - 1,2,3,4 - tetrahydro-1-naphthaleneacetamide sintering at approximately 79° and melting at 87–91°. The product has the formula

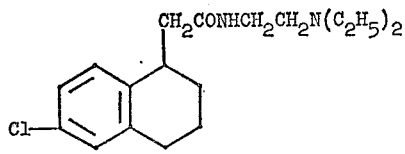

EXAMPLE 2

6-chloro-N-(3-dimethylaminopropyl) - 1,2,3,4 - tetrahydro-1-naphthaleneacetamide.—Substitution of 21 parts of N,N-dimethyl-1,3-propanediamine for the N,N-diethylethylenediamine called for in Example 1F affords, by the procedure there detailed, 6-chloro-N-(3-dimethylaminopropyl)-1,2,3,4-tetrahydro-1-naphthaleneacetamide which, recrystallized from a mixture of benzene and hexane, melts at 75–77°. The product has the formula

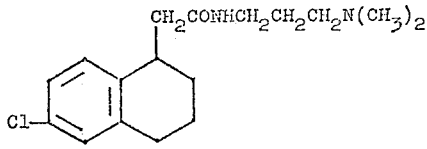

EXAMPLE 3

6-chloro-N-(4-diethylamino - 1 - methylbutyl)-1,2,3,4-tetrahydro-1-naphthaleneacetamide.—Substitution of 33 parts of N,N-diethyl-1,4-pentanediamine for the N,N-diethylethylenediamine called for in Example 1(F) affords, by the procedure there detailed, 6-chloro-N-(4-diethylamino-1-methylbutyl)-1,2,3,4 - tetrahydro-1-naphthaleneacetamide boiling at 195–202°/0.5 mm. pressure. The product has the formula

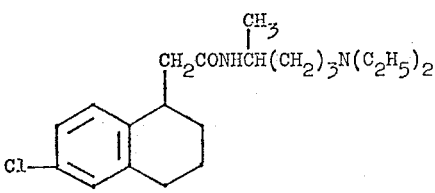

EXAMPLE 4

(A) 6-chloro-3,4-dihydro - 1 - naphthaleneacetyl chloride.—Substitution of 10 parts of 6-chloro-3,4-dihydro-1-naphthaleneacetic acid for the 6-chloro-1,2,3,4-tetrahydro-1-naphthaleneacetic acid called for in Example 1(E) affords, by the procedure there detailed, 6-chloro-3,4-dihydro-1-naphthaleneacetyl chloride.

(B) 6-chloro-N-(2-dimethylaminoethyl)-3,4-dihydro-1-naphthaleneacetamide.—Substitution of 49 parts of 6-chloro-3,4-dihydro-1-naphthaleneacetyl chloride and 19 parts of N,N-dimethylethylenediamine for the 6-chloro-1,2,3,4-tetrahydro-1-naphthaleneacetyl chloride and N,N-diethylethylenediamine, respectively, called for in Example 1(F) affords, by the procedure there detailed, 6-chloro-N-(2-dimethylaminoethyl) - 3,4 - dihydro-1-naphthaleneacetamide, having the formula

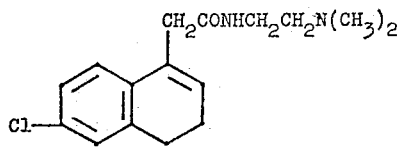

EXAMPLE 5

6-chloro-N-(4-diethylamino-1-methylbutyl) - 3,4 - dihydro-1-naphthaleneacetamide.—Substitution of 49 parts of 6-chloro-3,4-dihydro-1-naphthaleneacetyl chloride and 34 parts of N,N-diethyl-1,4-pentanediamine for the 6-chloro-1,2,3,4-tetrahydro-1-naphthaleneacetyl chloride and N,N-diethylethylenediamine, respectively, called for in Example 1(F) affords, by the procedure there detailed, 6-chloro-N-(4-diethylamino - 1 - methylbutyl)-3,4-dihydro-1-naphthaleneacetamide, having the formula

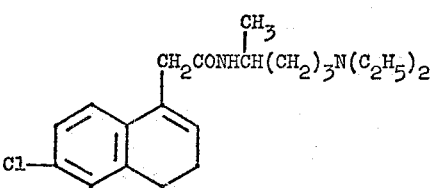

EXAMPLE 6

(A) 2-dimethylaminoethyl 6-chloro-1,2,3,4-tetrahydro-1-naphthaleneacetate.—A mixture of 68 parts of 6-chloro-1,2,3,4-tetrahydro-1-naphthaleneacetic acid, 39 parts of 2-chloro-N,N-dimethylethylamine, and 800 parts of 2-propanol is heated at the boiling point under reflux for 5 hours, whereupon solvent is removed by vacuum distillation and the residue mixed with 500 parts of ether, 600 parts of water, and sufficient concentrated hydrochloric acid to lower the pH to 2. The aqueous phase is thereupon separated, washed with ether, made alkaline with aqueous 10% sodium hydroxide, and extracted with ether. The extract is dried over anhydrous potassium carbonate and stripped of solvent by vacuum distillation. The residue, an oil, is 2-dimethylaminoethyl 6-chloro-1,2,3,4-tetrahydro-1-naphthaleneacetate. It has the formula

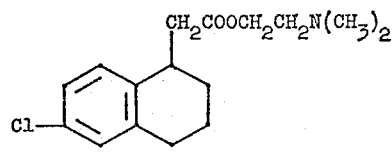

(B) 2-dimethylaminoethyl 6-chloro-1,2,3,4-tetrahydro-1-naphthaleneacetate hydrochloride.—A solution of 5 parts of 2-dimethylaminoethyl 6-chloro-1,2,3,4-tetrahydro-1-naphthaleneacetate in 20 parts of anhydrous ethanol is acidified with hydrogen chloride dissolved in 2-propanol, whereupon sufficient ether is added to induce cloudiness. The crystalline precipitate which forms is 2-dimethylaminoethyl 6-chloro - 1,2,3,4 - tetrahydro-1-naphthaleneacetate hydrochloride. The product, isolated by filtration and dried in air, sinters at approximately 97° and melts at 99–104° with gas evolution.

EXAMPLE 7

(A) 2-diethylaminoethyl 6-chloro-1,2,3,4-tetrahydro-1-naphthaleneacetate.—Substitution of 45 parts of 2-chloro-N,N-diethylethylamine for the 2-chloro-N,N-dimethylethylamine called for in Example 6(A) affords, by the procedure there detailed, 2-diethylaminoethyl 6-chloro-1,2,3,4-tetrahydro-1-naphthaleneacetate, having the formula

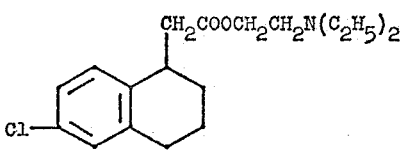

(B) 2-diethylaminoethyl 6-chloro-1,2,3,4-tetrahydro-1-naphthaleneacetate hydrochloride.—Substitution of 5 parts of 2-diethylaminoethyl 6 - chloro-1,2,3,4-tetrahydro-1-naphthaleneacetate for the 2-dimethylaminoethyl 6-chloro - 1,2,3,4 - tetrahydro-1-naphthaleneacetate called for in Example 6(B) affords, by the procedure there detailed, 2-diethylaminoethyl 6-chloro-1,2,3,4-tetrahydro-1-naphthaleneacetate hydrochloride sintering at approximately 129° and melting at 131.5–133° with gas evolution.

EXAMPLE 8

(A) 2-diisopropylaminoethyl 6-chloro-1,2,3,4-tetrahydro-1-naphthaleneacetate.—Substitution of 55 parts of 2-chloro-N,N-diisopropylethylamine for the 2-chloro-N,N-dimethylethylamine called for in Example 6(A) affords, by the procedure there detailed, 2-diisopropylaminoethyl 6-chloro-1,2,3,4-tetrahydro-1-naphthaleneacetate, having the formula

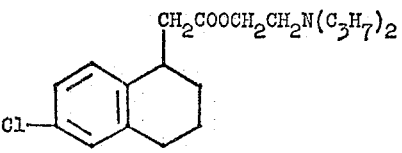

(B) 2 - diisopropylaminoethyl 6-chloro-1,2,3,4-tetrahydro-1-naphthaleneacetate hydrochloride.—Substitution of 5 parts of 2-diisopropylaminoethyl 6-chloro-1,2,3,4-tetrahydro-1-naphthaleneacetate for the 2-dimethylaminoethyl 6-chloro - 1,2,3,4 - tetrahydro-1-naphthaleneacetate called for in Example 6(B) affords, by the procedure there detailed, 2-diisopropylaminoethyl 6-chloro-1,2,3,4-tetrahydro-1-naphthaleneacetate hydrochloride sintering at approximately 126° and melting at 131–133° with gas evolution.

(C) 2-diisopropylaminoethyl 6-chloro-1,2,3,4-tetrahydro-1-naphthaleneacetate methobromide.—A solution of 82 parts of 2-diisopropylaminoethyl 6-chloro-1,2,3,4-tetrahydro-1-naphthaleneacetate and 33 parts of methyl bromide in 1200 parts of butanone is maintained in a sealed vessel at 60° for 96 hours, then chilled to 0°. The crystalline precipitate which forms is filtered off, successively washed on the funnel with butanone and ether, and dried in air. The product thus isolated is 2-diisopropylaminoethyl 6 - chloro - 1,2,3,4 - tetrahydro-1-naphthaleneacetate methobromide melting at 154–158° with gas evolution.

EXAMPLE 9

4-diethylamino-1-methylbutyl 6-chloro-1,2,3,4-tetrahydro-1-naphthaleneacetate.—Substitution of 59 parts of 4-chloro-N,N-diethylphentylamine for the 2-chloro-N,N-dimethylethylamine called for in Example 6(A) affords, by the procedure there detailed, 4-diethylamino-1-methylbutyl 6-chloro - 1,2,3,4 - tetrahydro-1-naphthaleneacetate, having the formula

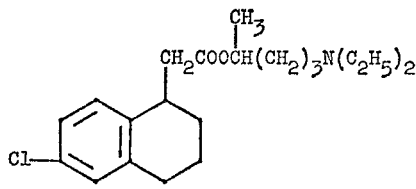

EXAMPLE 10

(A) 2-diethylaminoethyl 6-chloro-3,4-dihydro-1-naphthaleneacetate.—Substitution of 67 parts of 6-chloro-3,4-dihydro-1-naphthaleneacetic acid and 45 parts of 2-chloro-N,N-diethylethylamine for the 6-chloro-1,2,3,4-tetrahydro-1-naphthaleneacetic acid and 2-chloro-N,N-dimethylethylamine, respectively, called for in Example 6(A) affords, by the procedure there detailed, 2-diethylaminoethyl 6-chloro-3,4-dihydro-1-naphthaleneacetate, having the formula

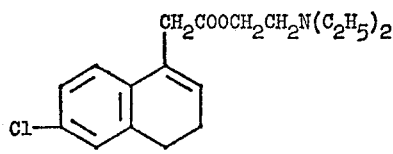

(B) 2-diethylaminoethyl 6-chloro-3,4-dihydro-1-naphthaleneacetate hydrochloride.—Substitution of 5 parts of 2-diethylaminoethyl 6-chloro-3,4-dihydro-1-naphthaleneacetate for the 2-dimethylaminoethyl 6-chloro-1,2,3,4-tetrahydro-1-naphthaleneacetate called for in Example 6(B) affords, by the procedure there detailed, 2-diethylaminoethyl 6-chloro-3,4-dihydro-1-naphthaleneacetate hydrochloride sintering at approximately 138° and melting at 142–144° with gas evolution.

EXAMPLE 11

(A) 2 - diisopropylaminoethyl 6-chloro - 3,4 - dihydro-1-naphthaleneacetate. Substitution of 67 parts of 6-chloro-3,4-dihydro-1-naphthaleneacetic acid and 55 parts of 2-chloro-N,N-diisopropylethylamine for the 6-chloro-1,2,3,4-tetrahydro-1-naphthaleneacetic acid and 2-chloro-N,N-dimethylethylamine, respectively, called for in Example 6(A) affords, by the procedure there detailed, 2-diisopropylaminoethyl 6-chloro-3,4-dihydro-1-naphthaleneacetate, having the formula

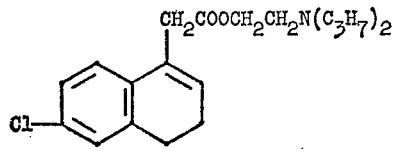

(B) 2-diisopropylaminoethyl 6-chloro - 3,4 - dihydro-1-naphthaleneacetate methobromide.—Substitution of 81 parts of 2-diisopropylaminoethyl 6-chloro-3,4-dihydro-1-naphthaleneacetate for the 2-dimethylaminoethyl 6-chloro-1,2,3,4-tetrahydro-1-naphthaleneacetate called for in Example 6(B) affords, by the procedure there detailed, 2-diisopropylaminoethyl 6-chloro-3,4-dihydro-1-naphthaleneacetate methobromide which, further purified by washing with ether and redrying, sinters at approximately 130° and melts at 133–140° with gas evolution.

(C) 2-diisopropylaminoethyl 6 - chloro-3,4-dihydro-1-naphthaleneacetate methiodide.—A solution of 81 parts of 2-diisopropylaminoethyl 6-chloro-3,4-dihydro-1-naphthaleneacetate and 43 parts of methyl iodide in 1200 parts of butanone is heated at 60° in a sealed vessel for 96 hours, then cooled to 25° and diluted with sufficient ether to induce cloudiness. The resultant mixture is chilled to 0°. The precipitate which forms is filtered off, washed on the filter with ether, and dried in air. The product thus isolated is 2-diisopropylaminoethyl 6-chloro-3,4-dihydro-1-naphthaleneacetate methiodide sintering at approximately 130° and melting at 135–137° was gas evolution.

EXAMPLE 12

4-diethylamino - 1 - methylbutyl 6-chloro-3,4-dihydro-1-naphthaleneacetate.—Substitution of 67 parts of 6-chloro-3,4-dihydro-1-naphthaleneacetic acid and 59 parts of 4-chloro-N,N-diethylpentylamine for the 6-chloro-1,2,3,4-tetrahydro-1-naphthaleneacetic acid and 2-chloro-N,N-dimethylethylamine, respectively, called for in Example 6A affords, by the procedure there detailed, 4-diethylamino-1-methylbutyl 6-chloro-3,4-dihydro-1-naphthaleneacetate, having the formula

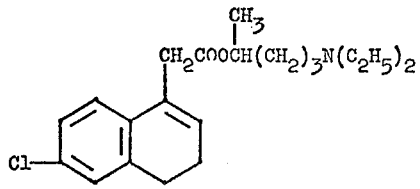

What is claimed is:

1. A compound of the formula

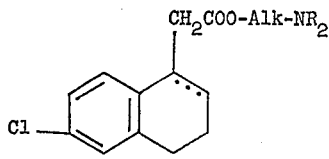

wherein Alk represents alkylene containing more than 1 and fewer than 6 carbon atoms, R represents lower alkyl, and the dotted line represents $\Delta^1$ unsaturation.

2. A compound according to claim 1 having the formula

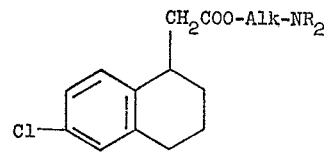

wherein Alk represents alkylene containing more than 1 and fewer than 6 carbon atoms and R represents lower alkyl.

3. A compound according to claim 1 which is 2-dimethylaminoethyl 6 - chloro-1,2,3,4-tetrahydro-1-naphthaleneacetate.

4. A compound according to claim 1 which is 2-diisopropylaminoethyl 6-chloro-1,2,3,4-tetrahydro-1-naphthaleneacetate.

5. A compound according to claim 1 having the formula

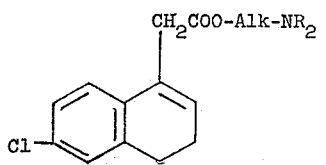

wherein Alk represents alkylene containing more than 1 and fewer than 6 carbon atoms and R represents lower alkyl.

6. A compound according to claim 1 which is 2-diethylaminoethyl 6-chloro-3,4-dihydro-1-naphthaleneacetate.

7. A compound according to claim 1 which is 2-diisopropylaminoethyl 6-chloro-3,4-dihydro-1-naphthaleneacetate.

References Cited

UNITED STATES PATENTS

| 3,420,822 | 1/1969 | Casadino | 260—469 |
| 3,468,939 | 9/1969 | Kaltenbronn | 260—469 |

OTHER REFERENCES

Chemical Abstracts, vol. 47, 8058a.

LORRAINE A. WEINBERGER, Primary Examiner

P. J. HAGAN, Assistant Examiner

U.S. Cl. X.R.

260—473 F, 501.16, 515 A, 544 M; 424—308